US007398179B2

(12) United States Patent
Agapiou et al.

(10) Patent No.: US 7,398,179 B2
(45) Date of Patent: Jul. 8, 2008

(54) PART MEASUREMENT PRIORITIZATION SYSTEM AND METHOD

(75) Inventors: John S. Agapiou, Rochester Hills, MI (US); Robert K. Aas, Ypsilanti, MI (US); Pulak Bandyopadhyay, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 171 days.

(21) Appl. No.: 11/203,819

(22) Filed: Aug. 15, 2005

(65) Prior Publication Data

US 2006/0047457 A1 Mar. 2, 2006

Related U.S. Application Data

(60) Provisional application No. 60/604,260, filed on Aug. 25, 2004.

(51) Int. Cl.
*G01B 7/008* (2006.01)

(52) U.S. Cl. ........................................ 702/155

(58) Field of Classification Search .................. 702/81, 702/90–95, 97, 104, 105, 150, 152–158, 702/168, 179, 181, 184; 382/154; 356/601
See application file for complete search history.

(56) References Cited

U.S. PATENT DOCUMENTS 6,064,759 A * 5/2000 Buckley et al. ............. 382/154
2002/0189319 A1* 12/2002 Abbe ......................... 73/1.01

OTHER PUBLICATIONS

T. Gruget and D. Djurdjanovic, "Optimal reduction of measurements in an existing manufacturing process," 2nd International Conference on Reconfigurable Manufacturing, University of Michigan, Ann Arbor, Aug. 2003.

* cited by examiner

*Primary Examiner*—Edward Raymond
*Assistant Examiner*—Mohamed Charioui

(57) ABSTRACT

A system, method, and apparatus are provided for prioritizing the measurements made on manufactured parts while maintaining specified part quality standards. According to the method, system and apparatus, the process used by the CMM is modified so that the number of measurements made is reduced in accordance with the results of the analysis provided herein. A CMM apparatus is modified in accordance with the analysis results. A method for part measurement prioritization in a measuring system and method includes describing a set of features to be measured on a plurality of substantially identical parts, separating the set of features into sensitive features and non-sensitive features, dividing the non-sensitive features into a plurality of groups, and prioritizing the part measurements to measure the sensitive features and provide alternating measurements of the non-sensitive features.

20 Claims, 3 Drawing Sheets

100
MEASUREMENT FEATURES DESCRIBED 102
RISK LEVEL PRESCRIBED 103
INTERVAL PRESCRIBED 104
NUMBER PRESCRIBED 105
SEPARATE INTO SENSITIVE FEATURES AND NONSENSITIVE FEATURES 106
CATEGORIZE NONSENSITIVE FEATURES 108
I. SIMILAR FEATURES, SAME TOOL
II. SIMILAR FEATURES, DIFFERENT TOOLS
III. DISSIMILAR FEATURES, SAME OR DIFFERENT TOOLS
109
LOCATION AND SIZE MEASUREMENT REDUCTION 110
FORM AND PROFILE MEASUREMENT REDUCTION 112
REDUCE OR ALTERNATE MEASUREMENTS OF NONSENSITIVE FEATURES DUE TO:
• NONSENSITIVE MEASUREMENTS LESS OFTEN OUT OF TOLERANCE
• CORRELATIONS IN CATEGORIES I, II, OR III, OR WITH SENSITIVE MEASUREMENTS 114
FROM INSPECTIONS, VALIDATE RISK CALCULATION 116
OUTPUT NUMBER OF PARTS TO BE MEASURED FOR PRESCRIBED RISK LEVEL 118

PART MEASUREMENT PRIORITIZATION SYSTEM AND METHOD

CROSS REFERENCE TO RELATED APPLICATIONS

This application claims priority to U.S. Provisional Application Ser. No. 60/604,260, titled, "PART MEASUREMENT OPTIMIZATION SYSTEM AND METHOD," filed Aug. 25, 2004, which is incorporated by reference herein in its entirety.

TECHNICAL FIELD

Disclosed are a system, method and apparatus for prioritizing part measurement. More specifically, the system, method and apparatus is for reducing or eliminating certain measurements during the part measurement process to save time and resources in the manufacture of, for example, automotive cast and machined parts.

BACKGROUND OF THE INVENTION

In the automotive industry, as in many other industries, metal parts are manufactured in large volume. Processes for manufacturing the parts may include casting and machining. In the automotive industry in particular, manufacturers prefer that parts used in engine manufacture be within tolerance for long and consistent operation of the engine. A quality metric, quality index, or quality standard may be defined based on the extent to which a part is measured to be within tolerance. A nonconforming part is one that does not meet prescribed quality standards or manufacturing tolerances.

After or during their production, many parts used in engine manufacture are measured to assess their quality. Many manufacturing and production plants use a Coordinate Measuring Machine, or CMM. The CMM is a measuring machine tool that may have three axes with corresponding displacement transducers, a probe head to probe the workpiece in a plurality of spatial directions, a control unit, and a processor with software to perform calculations and present results.

The basic function of coordinate metrology consists of the measurement of the actual shape of a workpiece, its comparison with the desired shape, and the evaluation of the metrological information, such as size, form, location, and orientation. The actual shape of the workpiece is obtained by probing the surface at discrete measuring points. Thus, one step in coordinate metrology is selecting the set of features to be measured, the measuring points. Every measuring point is expressed in terms of its measured coordinates. The practice of metrology using the CMM can be defined as: generating the measured data by probing measuring points of the actual workpiece with the probe in the CMM; calculating the parameters of the workpiece such as size, form, location and orientation (e.g. diameter of a hole, the distance between two holes, the angle of a surface relative to a datum, and so on); and, evaluating the required workpiece features by comparing the calculated parameters with the drawing dimensions and tolerances.

Currently, in standard manufacturing procedure, all features or measuring points of a part are measured. The full measurement of the part requires significant time (generally 30 to 100 minutes). For example, the full measurement of a cylinder head may require 50 measured features and may take more than 100 minutes. Often, human resources are involved in placing the part within and removing the part from the CMM system and monitoring the measurements taken by a CMM system.

Thus, it is desirable to reduce the amount of time required to take the measurements of parts in the automotive and other industries so that fewer CMM systems are needed. Further it is desirable that fewer human operators are needed for the measurement process. It is also desirable to increase the number of parts measured during a given time so that production capacity may be increased while maintaining standards for parts.

SUMMARY OF THE INVENTION

Disclosed are a method, system, and apparatus for prioritizing the measurements made on manufactured parts while maintaining specified part quality standards. According to the method, system and apparatus, the process used by the CMM is modified so that the number of measurements made is reduced in accordance with the results of the analysis provided herein. A CMM apparatus is modified in accordance with the analysis results. A method for part measurement prioritization in a measuring system and method includes describing a set of features to be measured on a plurality of substantially identical parts, separating the set of features into sensitive features and non-sensitive features, dividing the non-sensitive features into a plurality of groups, and prioritizing the part measurements to measure the sensitive features and provide alternating measurements of the non-sensitive features.

In a further aspect as described below, risk analysis is utilized for evaluating the impact on part quality when some measured features are eliminated or measured at alternated intervals based on quality data. In yet another aspect as described herein, a measurement interval to assess a specified part quality is determined. In still another aspect, a measurement interval for a specified grouping of alternated features is determined, to assess a specified part quality.

DESCRIPTION OF THE PREFERRED EMBODIMENT

In accordance with the exemplary embodiments, the method, system and modified CMM apparatus provide an engineering tool for prioritizing measurements and for evaluating the impact on part quality when some of the measured features are eliminated or measured at alternated intervals based on existing quality data.

Figure 1:
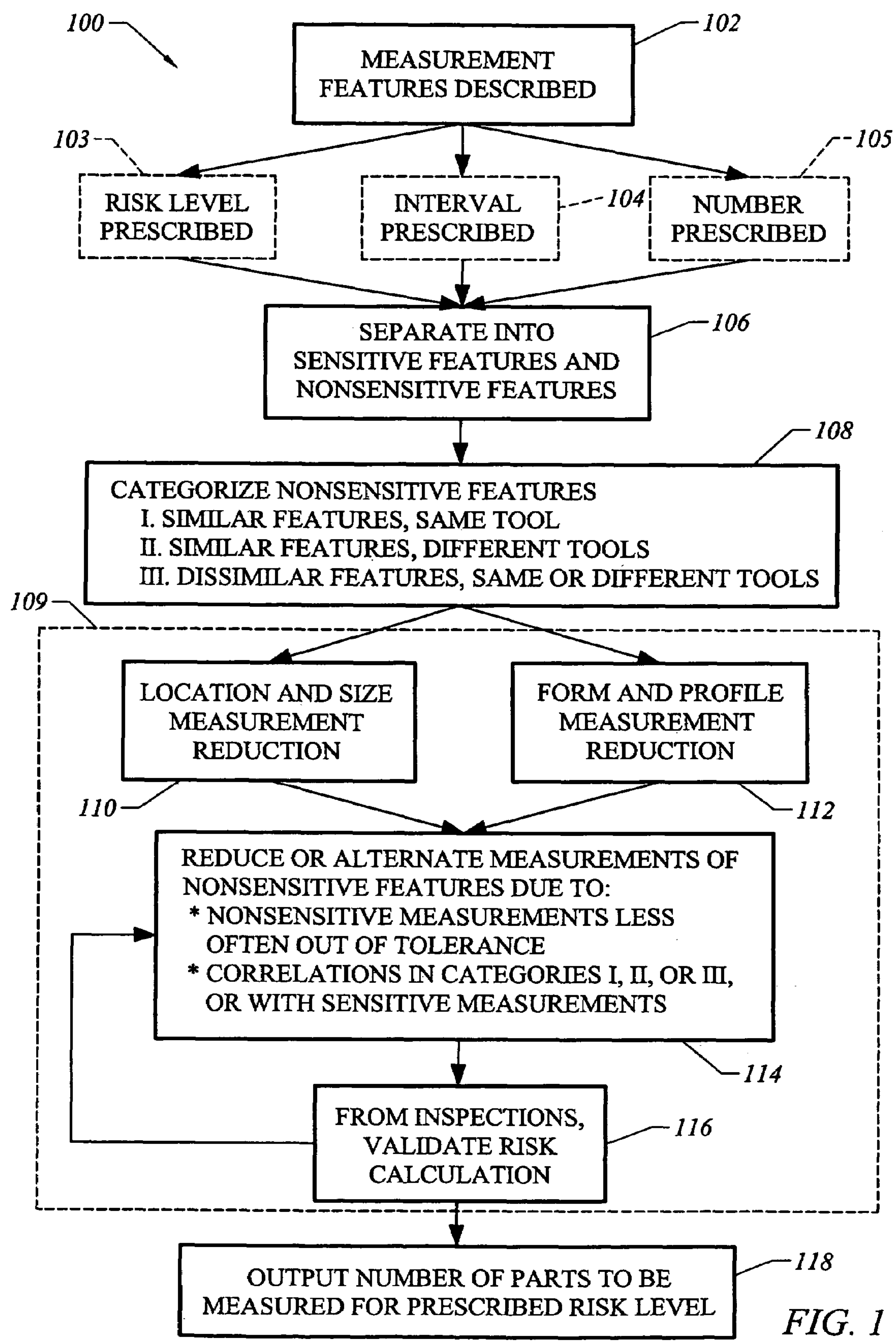
FIG. 1 is a flowchart showing steps of an exemplary embodiment of the method.

FIG. 1 shows steps of an embodiment as described in detail below. A method for part measurement prioritization in a measuring system and method includes describing a set of features to be measured on a plurality of substantially identical parts 102, separating the set of features into sensitive features and non-sensitive features 106, and prioritizing the part measurements to measure the sensitive features and provide alternating measurements of the non-sensitive features 109.

Briefly, features to be measured are described and a value of allowable or tolerable risk level may be prescribed. The method further analyzes the features according to whether part quality is sensitive to the feature or nonsensitive to the feature, and according to whether features are similar or dissimilar, and whether features are produced by the same tool or by different tools. In other steps, the method reduces the measurement of location and size related features, form and profile related features, and features determined to be non-sensitive features.

Briefly, the probability or risk level 103 which is based in statistics, and which is described in detail below, relates to impact on part quality is calculated for the reduced set of features to be measured, and the calculation validated. The number of parts to be measured to obtain the prescribed risk level may be output. FIG. 1 further shows that a measuring interval in time may optionally be prescribed 104, instead of a risk level as shown at 103. Moreover, a number of features or number of parts may optionally be prescribed 105 instead of prescribing a risk level 103 or prescribing a measuring interval 104.

As described herein, the system, method, and apparatus may be embodied in the form of any number of computer-implemented processes and apparatuses for practicing those processes. Embodiments of the invention may be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Returning now to FIG. 1, a method 100 for part measurement prioritization is shown. Part measurement prioritization involves selecting a measurement regime that provides adequate assessment of part quality while at the same time providing for optimal or near optimal use of scarce production resources. As described in more detail below, part measurement prioritization may involve eliminating or reducing the measurements of similar features made with the same tool, eliminating or reducing the measurement of similar features made with different tools, and eliminating or reducing measurements of distinct or dissimilar features made with the same or different tools.

In more detail, the method of FIG. 1 includes describing a set of features 102 to be measured on a plurality of substantially identical parts. Step 102 draws on previous manufacturing and/or production experience and current best practices in measurement methodology to determine the scope of feature specification to be sought. The features for measurement may be described by providing their x,y,z coordinates and description. Features may alternatively, or in addition, be described in another format suitable for NC (numerical control) or CNC (computer numerical control) machines. For some features, the description may be in terms of a derivative measured value, for example, the diameter of a hole, or the depth and pitch of the threads in a threaded hole. The set of features for measurement may be maintained, for example, in a feature list, in suitable format for processing by software.

Typically, historical production data is available for the set of features described in step 102. The feature list described in connection with step 102 may be provided to software controlling the operation of a CMM (see FIG. 3). The results obtained by the CMM may be stored in a database, and also rendered to a text or graphic display. The results may also be sent to a printer, plotter, or other device for producing hard-copy output. In this way, there may be available a database with previous measurement results for the set of features described in the list of step 102.

Briefly turning to step 106, features to be measured are separated in those deemed "sensitive" and those determined to be "nonsensitive." The separation into sensitive and non-sensitive features, and the possible presence of correlations among the measurement values of features, provide for prioritizing measurements of features, as will be explained in more detail below.

The three alternative steps may be executed prior to step 106, namely, prescribing a risk level 103, prescribing a measuring interval 104 and prescribing a number of parts or features to be measured 105. These alternative steps will be described in more detail below following further discussion of step 106.

In step 106, the set of features to be measured is separated into a set of "sensitive" features and a set of "non-sensitive" features. A feature is determined to be sensitive if its measurement value exceeds acceptable limits for measurement change over the measurement cycle. Sensitive features may be considered those affecting the performance of the part or the assembly and are usually defined in the part drawing. Nonsensitive features are those with smaller contribution to part quality functionality or assembly performance. A feature is determined to be nonsensitive if its measurement value does not exceed acceptable limits for measurement change over the measurement cycle. For example, 50 features may be measured in 500 parts (measured in a specified production interval, e.g. one part per hour) to determine which of the measurements are sensitive or non-sensitive. These measurement values may be part of the historical production data previously discussed.

Sensitive features may be routinely measured. For example, when every Nth part is taken from the production line for measurement, sensitive features are measured on the part. Non-sensitive features can be measured at specified intervals, but typically less frequently than sensitive features. That is, their measurements can be reduced or may even be eliminated. Sensitive features may also be subject to measurement reduction. The measuring interval is changed based on the functional relation between risk level and measurement interval just discussed. Sensitive features are measured at intervals to give a particular quality metric. Non-sensitive features may be measured at different intervals to give a particular quality metric (as well). Due to correlations (see discussion below about similar features made with the same tool, for instance), the probability of manufacturing a non-conforming part given a particular set of measurements made at particular measuring intervals is affected by measurements of both sensitive features and measurements of non-sensitive features. These correlations will be discussed in connection with step 108 below.

In a step 108 the non-sensitive features can be categorized into a number of categories. The categories may be disjoint, for example, category I including similar features made with the same tool, category II including similar features made with different tools, and category III including distinct features made with the same or different tools. In another embodiment, the categories may be distinct, but not necessarily disjoint.

Different levels of statistical correlation may be expected among measurements within each of the distinct or disjoint categories. For example, for category I, similar features made with the same tool, it may be expected that, for example, tool wear will affect those features to about the same degree. When a feature in category I is found to be out of tolerance, one or more other features in category I are likely to be found out of tolerance as well (for the same part). For example, when similar features are made with the same tool, the measurement of the first and last ones could be sufficient for quality performance based on the statistical evaluation of the machining system. The features can be expected to be correlated, with respect to their manufactured quality.

At the other extreme, distinct features made with the same or different tools (that is, features of category III), may be substantially less likely to be correlated with respect to their manufactured quality. There is little reason to expect tool wear to affect distinct features in a similar way or to about the same degree. When a feature in category III is found to be out of tolerance, or otherwise not satisfy a particular quality metric, there may be a particular reason to expect another feature of category III to be out of tolerance as well (for the same part). In addition, the tool life trend will affect the interval of measurements of various features. Therefore, the tool life distribution will be part of the statistical analysis for evaluating the parameters 103, 104 and 105.

In this way, it can be expected that features in category I, the set of similar features made with the same tool, are more tolerant of measurement reduction, than features in category II or III. It may be expected that the risk of manufacturing a nonconforming part by eliminating a measurement among those measurements in category I, is lower than eliminating a measurement among those measurements in category II or III. This expectation can be validated when the probability of manufacturing a nonconforming part, when that feature measurement has been eliminated in the measurement reduction step, is evaluated using known methods, as described above.

The probability or risk level is used because a part may not conform to specification, that is, the part's quality index or quality metric may be at or below a certain acceptable level, because one or more of the features measured or eliminated is near or out of tolerance. There are known methods for evaluating the risk of manufacturing a nonconforming part when not all parts are subjected to a measurement regime. The risk of such nonconformance to specifications occurring is estimated based on a probability calculation which may use, for example, a hypergeometric distribution, or for simplicity a binomial distribution. These distributions require the knowledge of the number of parts manufactured between measurements (i.e., the interval of single measurement), the number of measured parts between machine tool changes (such as machine coordinate offsets, replacement of cutting tools after wear or breakage, etc.), the definition of the number of parts "sample size" or interval to be included in the statistical analysis (e.g., the last five or fifty measured parts), and the definition of the acceptable number of nonconforming parts in the sample. Then the probability of nonconforming parts in the specified production span may be estimated, as stated above, using the hypergeometric or binomial distributions.

There may be a finite probability or risk level for nonconforming features, whether these features are measured or not, because not every part is inspected. It is recognized that since not all parts will have been completely inspected, it is possible for a very small number of nonconforming parts to be present and it may be desired to identify this risk statistically. The inspection level selected can determine the relationship between the measurement frequency and the number of features measured. The risk level can provide the probability that there are no nonconforming parts in a certain production span, or that there is only one or more nonconforming parts in that production span. The risk can be measured as explained above using statistical procedures.

Moreover, measurements can be made at particular intervals 104, for example, every tenth part may be taken from the production line for measurement. With this measuring interval, a particular risk level may be determined (again, using the known methods as described above). For a measuring interval of, for example, every fiftieth part, a different risk level may be determined. In this way, the risk level may be determined as a function of measuring interval. The functional relationship between risk level and measuring interval may be inverted to give measuring interval as a function of a specified risk level. A similar calculation may be made to provide risk level as a function of the number of parts measured. In the same way, the risk level may be calculated as a function of the number of features measured.

Alternatively, number of features or number of parts may optionally be prescribed 105 instead of prescribing a risk level 103 or prescribing a measuring interval 104.

Prioritization of part measurements is made at a step 109. The prioritization is carried out through a set of steps as shown in FIG. 1. For example, in steps 110 and 112, reduction in the set of measurements is made. The reduction may be based on experience, design or assembly requirements, details of the manufacturing process, and statistical analysis of historical or current production data. The reduced set of features for measurement may be maintained, for example, in a reduced feature list.

The measurement reduction function in the reduction steps 110 and 112 concerns two types of feature measurements; a first type defining location or size measurement and a second type defining form or profile measurement. These types are determined typically by assembling features into groups contributing primarily to location and size tolerance information, and groups contributing primarily to form and profile tolerance information. Herein and below, the term "error" is used to refer to the deviation of a part's actual location, size, form or profile, from engineering or manufacturing specification.

The reduction of location and size errors is evaluated, in step 110, by analyzing other similar features or features made by the same tool. For example, if a part is machined by a drilling machine to have a set of four through-holes, all of them machined with the same tool, the location of the center of each through-hole may be a feature for measurement, but it may suffice to take measurements of the diameter for only one of the four holes. Similar considerations may apply to a set of features resulting from part processing by a milling machine, and to a set of features resulting from part processing by a cutting machine, for example. These errors are mostly affected by the static errors of the machine assuming the tool wear is under control and predictable.

In contrast to reduction of location and size errors, the reduction of form or profile measurements in step 112 may be more complex because the CMM may measure only a sample of discrete points on surfaces whereas tolerance standards may require knowledge of the entire surface. A CMM can be also used to scan the whole part surface, but it is a long procedure using a significant amount of time, compared to probing a few points on the surface. After collecting a sample of data points, a zone fitting technique (such as least squares or minimum zone method) may be used to estimate the tolerance zone. Both the least squares method and the minimum zone method, used as a zone fitting technique on a sample of data points, may give biased estimates of the part form tolerance when the sample size is small. Other methods that may be used for zone fitting, such as for example, nonlinear methods, may also provide biased estimates for small sample sizes. Thus, the larger the sample size is, the better the evaluation of form or profile errors will be. However, large sample size will increase the measurement time and the effect of machine drift due to temperature. A sampling method that can reduce the sample size while maintaining reasonably high accuracy of the estimation is disclosed herein. The methodology is given below, and is briefly discussed here in connection with FIG. 2. The methodology utilizes the characteristics of the surface due to manufacturing surface pattern and expected distortions due to clamping loads, static cutting loads, and dynamic cutting loads. It employs the results from a Finite Element Analysis (FEA) based on clamping loads, static cutting loads, and dynamic cutting loads to estimate the surface points distorted the most, and therefore the more susceptible to nonconformance to manufacturing tolerances. Then the surface form or profile error is compared with that generated by the CMM using a scanning technique. The scanning technique traces the whole surface of a part and determines the form quality error. The scanning technique is slow and its use is avoided as much as possible during the gauging cycle of a part. Instead, it is replaced with probing the surface at individual probing points. When the selected points indicate similar nonconformance to tolerances of the surface profile or form as the scanning approach, these points are selected for measuring during the gauging cycle of the part in order to reduce the gauging time. This procedure for sample size reduction while maintaining high accuracy is used for form or profile error measurement of surfaces. A more detailed discussion of step 112 is provided below in connection with FIG. 2.

Returning now with discussion of FIG. 1, reduction of measurements may continue in a step 114. Nonsensitive features may be measured less frequently, without adversely affecting determination of product quality, due to several factors. First, the quality metric defined for a part may be relatively insensitive to measurement of a nonsensitive feature. Second, it may be that nonsensitive features are found to be less frequently out of tolerance because the tolerance is wider compared to that of sensitive features or the cutting tools have long and predictable life. Third, whether a nonsensitive feature is out of tolerance may be correlated with whether another feature is measured to be out of tolerance. The other feature may be in category I, II, or III, defined above, or may even be a sensitive feature (and thus always measured). In the case of correlation, measurement of the nonsensitive feature may be reduced, or even eliminated, without adversely affecting determination of product quality.

As a part of step 114, the non-sensitive features can be categorized into a number of measurement groups. Each measurement group may be measured at reduced rates (i.e., longer intervals between measurements) than the measurements of sensitive features. However, not all groups may be measured at the same reduced rate. In general, the groups of non-sensitive features are said to be measured at alternate intervals.

For example, feature A may be sensitive, and therefore always measured. This means, if quality criteria dictate that every hundredth part be measured, feature A will always be measured when a part is chosen for measurement. Features B and C may be specified for measurement for every four-hundredth part, and feature D may be specified for measurement every two-hundredth part. To accomplish this measurement regime, every other time feature A is measured, feature D may be measured. On alternate measurements of feature D, features B and C may be measured on the same part. Such a measurement regime may be depicted in tabular form. Thus:

| A | A | A | A | A | A | A | A |
|---|---|---|---|---|---|---|---|
| D | | D | | D | | D | |
| B | | | | B | | | |
| C | | | | C | | | |

Alternatively, feature B may be measured on one part on which feature D is measured, and feature C may be measured on the next part on which feature D is measured. Thus, another measurement regime may be depicted in tabular form as:

| A | A | A | A | A | A | A | A |
|---|---|---|---|---|---|---|---|
| D | | D | | D | | D | |
| B | | | | B | | | |
| | | C | | | | C | |

Another alternative measurement regime may be to measure B and C alternately when D is not measured, as shown next.

| A | A | A | A | A | A | A | A |
|---|---|---|---|---|---|---|---|
| D | | D | | D | | D | |
| | B | | | | B | | |
| | | | C | | | | C |

The last measurement regime is probably preferable, since on every hundredth part, two measurements are made. In the first two regimes shown, the number of measurements on a hundredth part may vary between one, two, three, or four, depending on which measurement regime is chosen. Measurements of B, C, and D are termed alternating measurements. At least one measurement of the sensitive feature A occurs between two measurements of B, between two measurements of C, and between two measurements of D. In addition, the last measurement regime shows how measurements of B and D, and measurements of C and D, and B and C, can be considered alternating with each other.

In cases where the measurement rate for non-sensitive features is not commensurable with the measurement rate for sensitive features, measurement reduction may employ sampling, perhaps using a random number generator, or other stochastic techniques, to select features for measurement at a particular measurement event. The term alternating measurement is also used in this case.

The measurement reduction in step 114 uses a statistical calculation, as previously described, to provide that the reduced measurement regime suffice for a prescribed risk level, or other manufacturing quality criterion. Thus, a part of step 114 is to estimate the measuring interval of alternated measurements or the number of parts required to be inspected for a specified risk of nonconforming parts or obtaining a specified quality, and vice versa. This provides for evaluation of the impact on part quality upon elimination of some measured features, or upon reduction in the measurement of some measured features.

In a step 116, part inspections may be used to validate the risk level calculated for the reduced measurement regime. Depending on the outcome of inspections, the method may return to step 114. It will also be appreciated that steps 110 and 112 may occur simultaneous with step 114, or parts of steps 110 and 112 may follow parts of step 114. In this manner, the method may also return to step 110 or step 112 from step 116, instead of returning to step 114.

Figure 2:
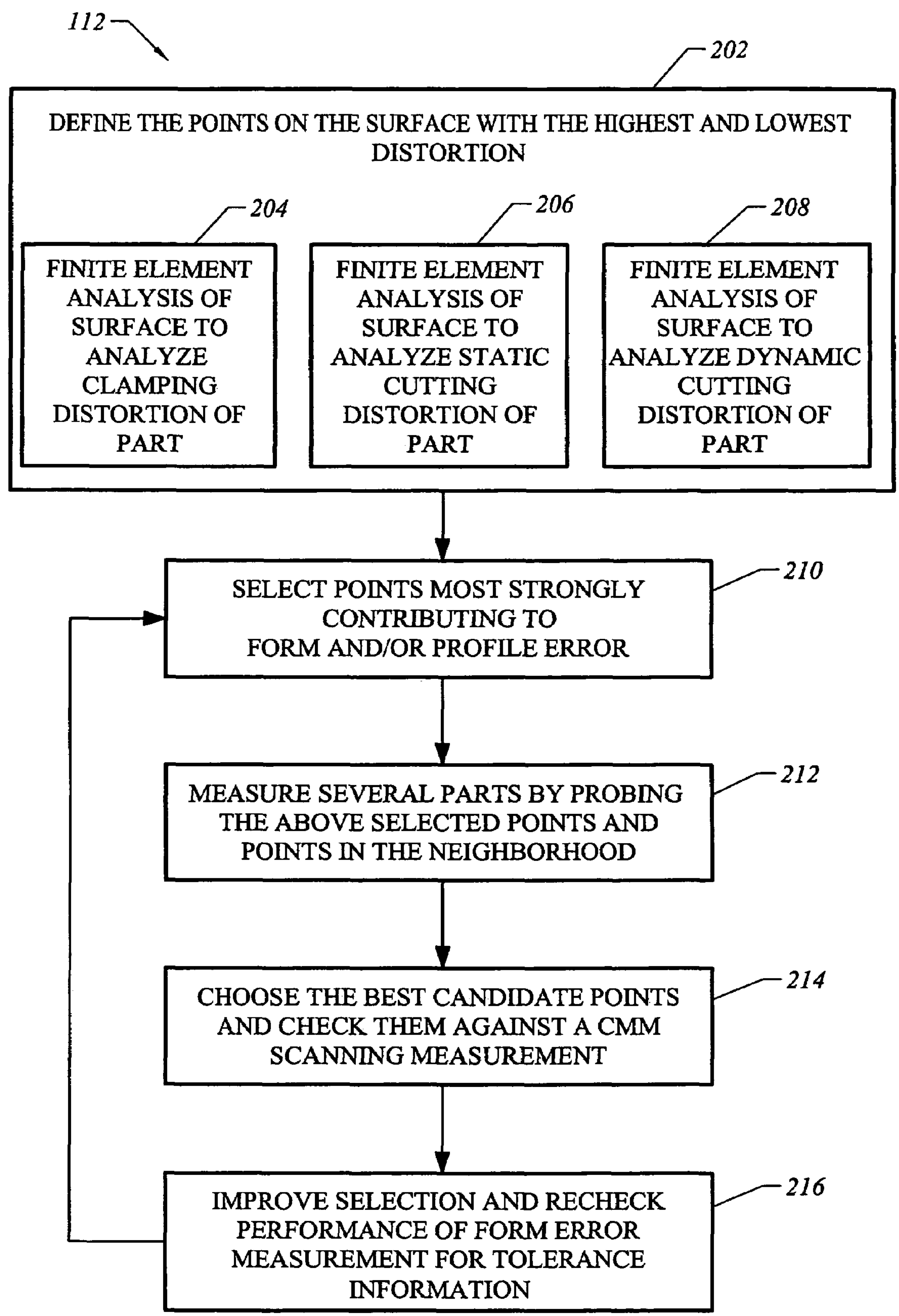
FIG. 2 shows further detail of the form and profile measurement of FIG. 1.

Now turning to FIG. 2, details of step 112 of FIG. 1, reduction of form and profile measurements are shown. In a step 202, points on the part surface with the highest and lowest distortion are defined. The defined points are therefore features that may be measured as part of a measurement regime. Step 202 can employ, for example, finite element analysis (FEA) to examine different sources of distortion.

In steps 204, 206, and 208, FEA can be used to analyze distortions that may be present during manufacture and may therefore contribute to nonconformance of a part to manufacturing tolerances. In step 204, FEA can be used to analyze distortion of a part due to clamping. In step 206, FEA may provide for analysis of static cutting distortion of the part. In step 208, FEA may provide for analysis of dynamic cutting distortion of the part. From the analyses it can be determined which feature measurements are best indicators of nonconformance to form and profile tolerances.

Following the finite element analyses of steps 204, 206, and 208, an iterative process of selecting features to be measured begins at a step 210. In step 210, results of the finite element analyses are used to select candidate points or features most strongly contributing to form and/or profile error. Thus, the points selected are those that may be likely to be out of tolerance for a part that does not conform to manufacturing quality standards or tolerances.

In a step 212, several parts can be chosen from production, and measurements are made by probing the points selected in step 210. Points on the part surfaces in the neighborhoods of the selected points may also be probed. The points can be probed, and the measurements made, through use of a CMM.

In a step 214, results of step 212 can be examined. The best candidate points are chosen. A CMM scanning measurement is carried out to provide detailed information about the surface, and the scanning measurement results used to check the candidate points. Better candidate points may be those that indicate nonconformance to tolerance whenever the form or profile error of the surface, as determined by the scanning measurement, exceeds tolerance, and that do not indicate nonconformance to tolerance whenever the form or profile error of the surface, as determined by the scanning measurement, does not exceed tolerance.

In a step 216, the selection of points is improved, and performance is rechecked. Step 216 may return to step 210. If the set of points chosen provides good tolerance information for form and profile measurements, step 112 may end with step 216. In this way measurements of features, in groups contributing primarily to form and profile tolerance information, may be reduced.

Returning once more to FIG. 1, the measurement reduction of step 114 eliminates or reduces the number of times the non-sensitive features of a given part are measured. Certain values for the number of times a non-sensitive feature needs to be measured in a given set of parts may be empirically provided, or alternatively, algorithms may be used for calculation of the values. Statistical correlations between data taken, for example, day to day, or hour to hour, may be utilized to determine the rate a given measurement changes over a longer period of time.

The risk level, mentioned above in connection with step 103, is a measure of the likelihood that a part may be manufactured that falls outside manufacturing tolerance or quality standards. The risk level may be quantified in units of, for example, number of parts per million falling outside manufacturing tolerance. Prescribing of risk level at step 103 may be based on production experience, manufacturing goals, or other factors. In an alternative embodiment, the number of parts to be measured may instead be prescribed, and the risk level may be determined in the course of the analysis described herein. In still another embodiment, the number of features to be measured may be prescribed, and the risk level may be determined as a result of the analysis as described below. Risk is a mathematical concept and its calculation is based upon known formulations. In this description the term risk is not to be taken with a negative connotation. It will be appreciated that probability may be used herein in place of risk, and risk level, without confusion.

The risk of manufacturing a part that does not meet production standards, due to eliminating or reducing the measurement of non-sensitive features, can be analyzed and the process may be modified accordingly. In step 114 the risk of making a part outside allowable tolerance levels is calculated. Moreover, part quality itself may be quantified by a quality index. Preferably, different combinations of optimizations may be subjected to risk analysis. These combinations may include: alternating the number of features measured, changing the number of alternations, changing the number of parts measured in a specified time frame, and changing the interval of measurements.

In addition to the risk other statistical parameters and procedures may be used for determining the elimination of a feature from the measurement, or a reduction in the measurement of a feature. For example, the measurement process will trace the mean shift and standard deviation for each feature (due to random events, worn or broken tool change, casting shift, machine tool accuracy and repeatability, CMM uncertainty, etc.) for a specified period. These parameters are used to control the process capability as expected. However, changes of the mean shift for each feature will be traced and may be allowed to vary within 1.5 of the standard deviation otherwise the statistical report will indicate a required machine offset change or the measurement of an additional part to verify the error. The mean shift change is also removed from the statistical analysis and part quality variation since it can be easily corrected by a machine move/offset. The estimated six sigma (from the measurements) is compared against the part specification tolerance for quality control. A parameter with several mean shifts cannot be removed easily unless the problem of the mean shift is identified. It is to be noted that the tool wear rate for each feature is also considered in the determination of the measurement elimination.

Other prioritization criteria as may be used in embodiments include: from the required part measurements in the CMM, eliminating or reducing the measurements of similar features made with the same tool, eliminating or reducing the measurement of similar features made with different tools, and eliminating or reducing measurements of distinct or dissimilar features made with the same or different tools.

In additional embodiments of this invention, non-sensitive measurements may be measured in a weighted grouping. Either empirically or by an algorithm, a step of an embodiment of this invention may include determining the optimum measurement grouping of alternated features. For example, in a given part, non-sensitive measurements A', B' and C' are measured in 50 parts, wherein A' is measured 15 times, B' is measured 20 times and C' is measured 15 times. The numbers of times A', B', and C', respectively, are measured may be adjusted to optimize cost, time, or another criterion.

In another embodiment of this invention, the allowable risk or probability of manufacturing a nonconforming part may be specified, and the required number and type of measurements to optimally assess that risk would be provided.

In still another embodiment, the method, system, and apparatus of this invention provides for evaluating the required measuring interval for a specified risk level, and vice versa.

Figure 3:
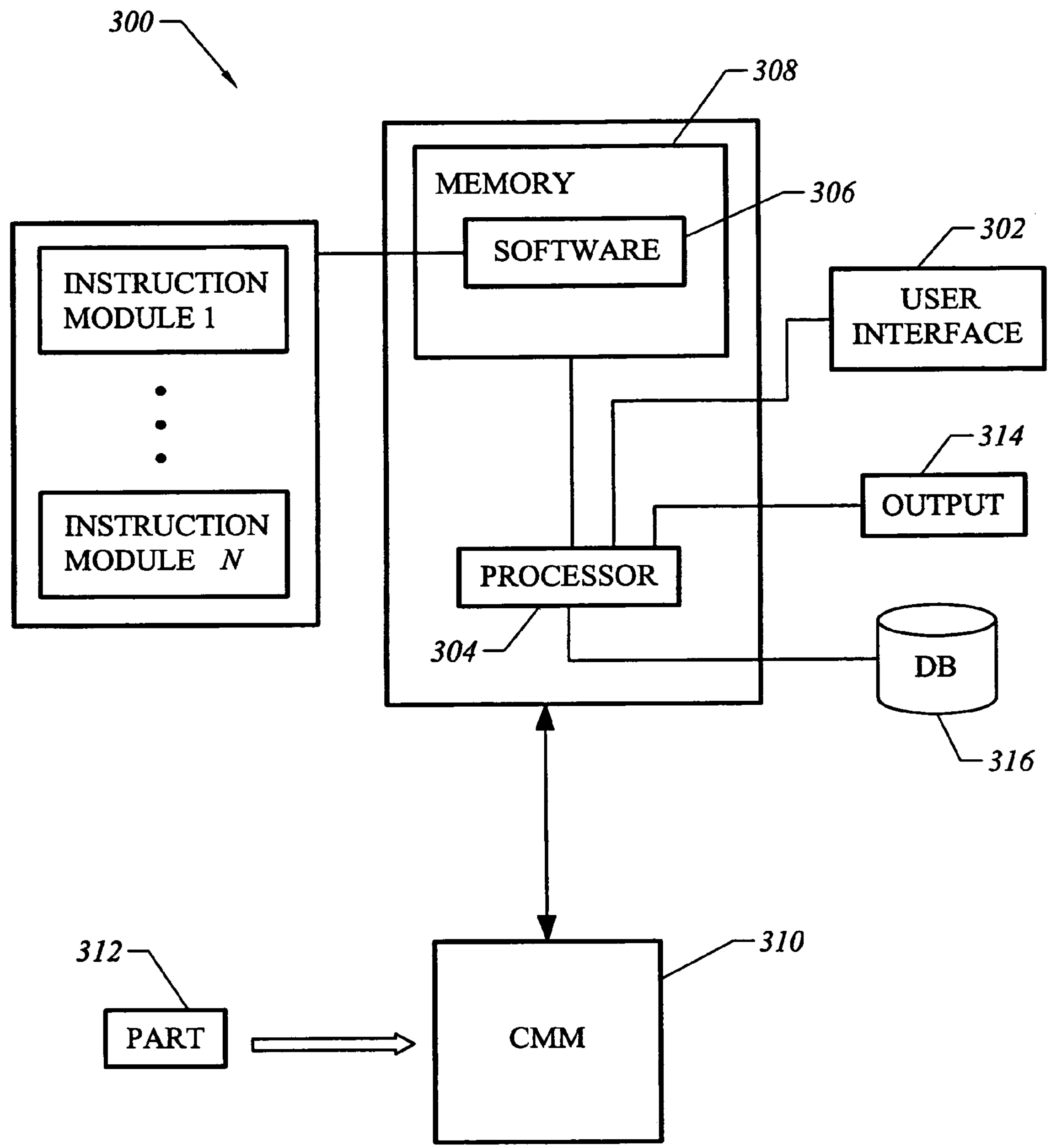
FIG. 3 shows a system and apparatus embodying aspects of the invention.

FIG. 3 shows a system and apparatus embodying aspects of the invention. The system and apparatus of FIG. 3 includes central system 300 as shown including, for example, a user interface module 302 for receiving input and displaying output, a processor module 304 in communication with software instructions from software modules 306 stored in a memory module 308. An algorithm implementing the methodology of FIG. 1 may be provided in the software modules. For example, software modules 306 may include a description module for describing a set of features to be measured on a substantially identical plurality of parts, a separating module for separating the set of features into sensitive features and non-sensitive features, and a prioritizing module for prioritizing the part measurements to measure the sensitive features and provide alternating measurements of the non-sensitive features. In addition, software modules 306 may include instructions for finite element analysis for analyzing clamping distortion, static cutting distortion, and dynamic cutting distortion.

FIG. 3 also shows a CMM 310 and a part 312 to be placed within the CMM and subjected to measurement of its features. The CMM may include a scanning function, or scanning capability. The results are output 314 as also shown in FIG. 3. A user may manipulate data from a database or external storage 316 that is processed by processor 304 according to computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for prioritized part measurement in a measuring system, the method comprising:

describing a set of features to be measured on a plurality of substantially identical parts;

separating the set of features into sensitive features and non-sensitive features;

prioritizing the part measurements to measure the sensitive features during every iteration of a measurement cycle and provide measurements of the non-sensitive features during alternating iterations of said measurement cycle; and measuring the set of features on the plurality of substantially identical parts in accordance with the prioritizing.

2. The method of claim 1, further comprising:

dividing the non-sensitive features into a plurality of groups;

wherein the non-sensitive features of the plurality of parts are categorized into categories, and at least two of the plurality of groups contain a distinct feature of one of the categories.

3. The method of claim 1 wherein the measurements have a number and type, the method further comprising:

specifying an allowable probability of manufacturing a nonconforming part; and determining a number and type of measurements to be made to assess the probability.

4. The method of claim 1 wherein the measurements have a measuring interval, the method further comprising:

specifying an allowable probability of manufacturing a nonconforming part; and determining a measuring interval to be used to assess the probability.

5. The method of claim 1 wherein the measurements have a number and type, the method further comprising:

specifying a number and type of measurements to be made on a plurality of parts; and determining a probability of manufacturing a nonconforming part.

6. The method of claim 1, further comprising:

alternating measurements of nonsensitive features in a weighted grouping.

7. The method of claim 1, further comprising:

providing form and profile measurement reduction using a finite element analysis.

8. A system for prioritized part measurement in a measuring system, the system comprising:

a description module for describing a set of features to be measured on a plurality of substantially identical parts;

a separating module for separating the set of features into sensitive features and non-sensitive features;

a prioritizing module for prioritizing the part measurements to measure the sensitive features during every iteration of a measurement cycle and provide measurements of the non-sensitive features during alternating iterations of said measurement cycle; and, a coordinate measuring machine for measuring the set of features on the plurality of substantially identical parts in accordance with the prioritizing from the prioritization module.

9. The system of claim 8, further comprising:

a division module for dividing the non-sensitive features into a plurality of groups;

wherein the non-sensitive features of the plurality of parts are categorized into categories, and at least two of the plurality of groups contain a distinct feature of one of the categories.

10. The system of claim 8, further comprising:

an interface module for providing commands to, and receiving measuring results from, a coordinate measuring machine.

11. The system of claim 8, further comprising:

an input module for receiving a specified number and type of measurements.

12. The system of claim 8, further comprising an input module for receiving a specified probability of nonconformance to manufacturing tolerance.

13. An apparatus comprising:

a coordinate measuring machine for receiving commands to control measurements;

a processor providing commands for use by the coordinate measuring machine that are generated by software comprising:

a description module for describing a set of features to be measured on a substantially identical plurality of parts;

a separating module for separating the set of features into sensitive features and non-sensitive features; and a prioritizing module for prioritizing the part measurements to measure the sensitive features during every iteration of a measurement cycle and provide measurements of the non-sensitive features during alternating iterations of said measurement cycle.

14. An apparatus as recited in claim 13 wherein the coordinate measuring machine includes a scanning function, the software further comprises:

finite element analysis instructions to analyze distortion of a part due to clamping; and using the coordinate measuring machine scanning function to assess a form and profile quality error.

15. An apparatus as recited in claim 13 wherein the coordinate measuring machine includes a scanning function, the software further comprises:

finite element analysis instructions to analyze static cutting distortion of a part; and using the coordinate measuring machine scanning function to assess a form and profile quality error.

16. An apparatus as recited in claim 13 wherein the coordinate measuring machine includes a scanning function, the software further comprises:

finite element analysis instructions to analyze dynamic cutting distortion of a part; and using the coordinate measuring machine scanning function to assess a form and profile quality error.

17. A method for prioritized part measurement in a measuring system, the method comprising:

describing a set of features to be measured on a plurality of substantially identical parts;

separating the set of features into sensitive features and non-sensitive features;

dividing the non-sensitive features into a plurality of groups;

wherein the non-sensitive features of the plurality of parts are categorized into categories, and at least two of the plurality of groups contain a distinct feature of one of the categories;

wherein the categories comprise a category of similar features produced by the same tool, a category of similar features made by different tools, and a category of dissimilar features;

eliminating a measurement of a feature of a category;

prioritizing the part measurements to measure the sensitive features and provide alternating measurements of the non-sensitive features during alternating iterations of said measurement cycle; and measuring the set of features on the plurality of substantially identical parts in accordance with the prioritizing.

18. A method for prioritized part measurement in a measuring system, the method comprising:

describing a set of features to be measured on a plurality of substantially identical parts;

separating the set of features into sensitive features and non-sensitive features;

dividing the non-sensitive features into a plurality of groups;

wherein the non-sensitive features of the plurality of parts are categorized into categories, and at least two of the plurality of groups contain a distinct feature of one of the categories;

wherein the categories comprise a category of similar features produced by the same tool, a category of similar features made by different tools, and a category of dissimilar features;

at least one of reducing and alternating a measurement of a feature of a category;

prioritizing the part measurements to measure the sensitive features and provide alternating measurements of the non-sensitive features during alternating iterations of said measurement cycle; and measuring the set of features on the plurality of substantially identical parts in accordance with the prioritizing.

19. A system for prioritized part measurement in a measuring system, the system comprising:

a description module for describing a set of features to be measured on a plurality of substantially identical parts;

a separating module for separating the set of features into sensitive features and non- sensitive features;

a division module for dividing the non-sensitive features into a plurality of groups;

wherein the non-sensitive features of the plurality of parts are categorized into categories, and at least two of the plurality of groups contain a distinct feature of one of the categories;

wherein the categories comprise a category of similar features are produced by the same tool, a category of similar features made by different tools, and a category of dissimilar features;

an elimination module for at least one of eliminating and alternating a measurement of a feature of a category;

a prioritizing module for prioritizing the part measurements to measure the sensitive features and provide alternating measurements of the non-sensitive features; and, a coordinate measuring machine for measuring the set of features on the plurality of substantially identical parts in accordance with the prioritizing from the prioritization module.

20. A system for prioritized part measurement in a measuring system, the system comprising:

a description module for describing a set of features to be measured on a plurality of substantially identical parts;

a separating module for separating the set of features into sensitive features and non- sensitive features;

a division module for dividing the non-sensitive features into a plurality of groups;

wherein the non-sensitive features of the plurality of parts are categorized into categories, and at least two of the plurality of groups contain a distinct feature of one of the categories;

wherein the categories comprise a category of similar features are produced by the same tool, a category of similar features made by different tools, and a category of dissimilar features;

a reduction module for at least one of reducing and alternating a measurement of a feature of a category;

a prioritizing module for prioritizing the part measurements to measure the sensitive features and provide alternating measurements of the non-sensitive features; and, a coordinate measuring machine for measuring the set of features on the plurality of substantially identical parts in accordance with the prioritizing from the prioritization module.

* * * * *